United States Patent
Bonsack

[11] 3,944,647
[45] Mar. 16, 1976

[54] RECOVERING CHLORINE FROM THE CHLORINATION OF TITANIFEROUS MATERIAL

[75] Inventor: James Paul Bonsack, Aberdeen, Md.
[73] Assignee: SCM Corporation, New York, N.Y.
[22] Filed: Apr. 8, 1974
[21] Appl. No.: 458,579

[52] U.S. Cl. .................. 423/72; 423/79; 423/472; 423/499; 423/500; 423/504; 423/633
[51] Int. Cl.² C01G 23/02; C01G 49/00; C01B 7/03; C01D 3/04
[58] Field of Search ....... 423/72, 79, 633, 472, 499, 423/500, 504

[56] References Cited
UNITED STATES PATENTS

| | | | |
|---|---|---|---|
| 2,533,021 | 12/1950 | Krchma | 423/79 X |
| 2,718,279 | 9/1955 | Kraus | 423/79 X |
| 3,066,010 | 11/1962 | Horning et al. | 423/79 X |
| 3,218,122 | 11/1965 | Nelson et al. | 423/633 |
| 3,376,112 | 4/1968 | Dunn, Jr. et al. | 423/463 |

*Primary Examiner*—Edward Stern
*Attorney, Agent, or Firm*—Jerry K. Mueller, Jr.; Merton H. Douthitt

[57] ABSTRACT

Vapor feed containing titanium tetrachloride and ferric chloride vapor is contacted with sodium chloride for complexing said ferric chloride as liquid sodium ferric chloride salt complex while leaving titanium tetrachloride as vapor residue. The salt complex is reacted with molecular oxygen for providing recovered chlorine gas product. Such gas can be recycled to said complexing operation for providing a high grade of chlorine and titanium tetrachloride-rich product. Substantially complete chlorination of ilmenite is a prime source of said vapor feed.

3 Claims, 1 Drawing Figure

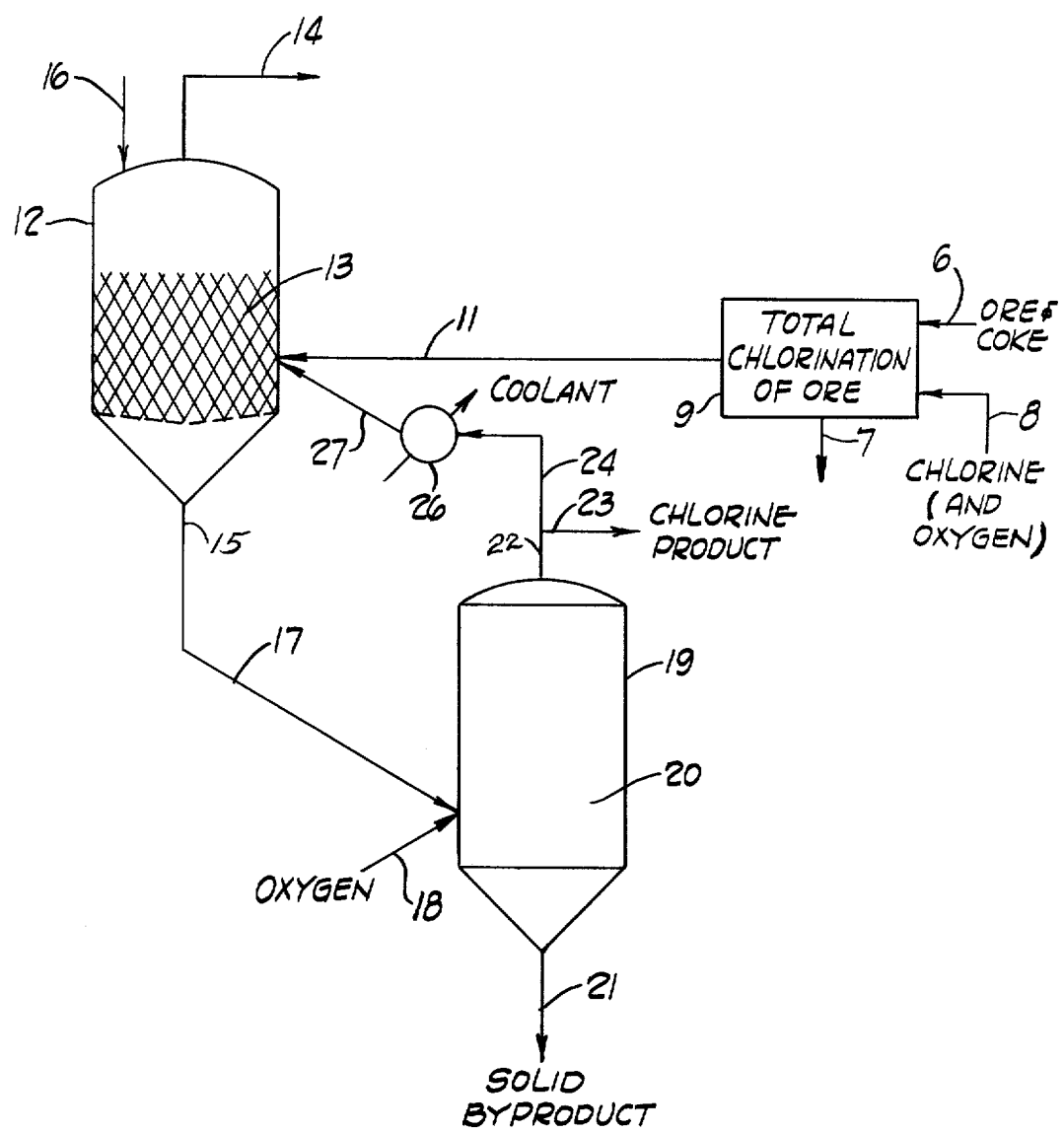

RECOVERING CHLORINE FROM THE CHLORINATION OF TITANIFEROUS MATERIAL

This application is cross-referenced to the following applications filed on the same date as this application, Apr. 8, 1974: James Paul Bonsack entitled U.S. Ser. No. 458,510 and, now U.S. Pat. No. 3,919,400 entitled "Recovering Chlorine from Ferric Chloride Vapors" and U.S. Ser. No. 458,509, now abandoned, entitled "Ferric Chloride Oxidation Reactor,"; the George R. Walker U.S. Ser. No. 459,034 entitled "Selective Chlorination of Ilmenite and the Like with Chlorine Recovery"; and the Bonsack and Walker U.S. Ser. No. 458,791 entitled "Oxidation of Ferric Chloride from Selective Chlorination." The disclosures of said listed applications are expressly incorporated in this one by reference.

This invention relates to an improvement in process for recovering chlorine from feed vapor laden with titanium tetrachloride vapor and ferric chloride vapor, and more particularly to such improvement wherein said feed vapor is obtained by the substantially total chlorination of titaniferous material.

The process of ferric chloride oxidation in which the following reaction is well-known:

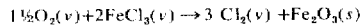

$$1\tfrac{1}{2}O_2(v) + 2FeCl_3(v) \rightarrow 3\ Cl_2(v) + Fe_2O_3(s)$$

At a temperature of 600° the equilibrium is reasonably favorable towards making the products chlorine gas and solid ferric oxide, but the reaction rate is extremely slow. At temperatures of 800°–900°, the rate improves markedly, but the reaction to make such poducts is significantly incomplete. Accordingly, ferric chloride which is thus unconverted from such total chlorination to make $TiCl_4$ is a contaminant representing a waste of chlorine. Titanium tetrachloride conventionally can be converted into titanium dioxide pigment, a product in great demand.

Heretofore it has been proposed to separate ferric chloride from titanium tetrachloride vapors, such mixture being generated during the chlorination of ilmenite, by converting such ferric chloride into a molten salt "complex" while allowing the titanium tetrachloride to remain as vapor residue for withdrawal from the complexing operation. This operation is described, for example, in the U.S. Bureau of Mines Reports of Investigation 5428 and 5602.

Heretofore it has also been proposed to generate chlorine gas and byproduct solid ferric oxide and sodium chloride by oxidation of said salt complex (U.S. Pat. No. 3,376,112). The instant improvement combines these two processes in a manner for their efficient utilization for chlorinating titaniferous material, that is, ilmenite ore, titaniferous slag, and mixtures of the same with each other, with or without the addition of rutile ore and/or brookite ore. Total chlorination of such material connotes chlorinating to obtain substantially all of the titanium values therein as titanium tetrachloride; other metal chlorides are formed in the process, ferric chloride ordinarily being the main one. The teachings of the U.S. patents and publications cited in this specification are incorporated herein expressly by reference.

Broadly this process comprises chlorinating such titaniferous material with chlorine gas with the resulting generation of a feed vapor laden with titanium tetrachloride and ferric chloride;

contacting said feed vapor with sodium chloride in a complexing zone under conditions for converting said ferric chloride therein into liquid ferric chloride salt complex while permitting said titanium tetrachloride to remain as vapor residue;

withdrawing a vapor residue stream containing said titanium tetrachloride from said complexing zone;

withdrawing said liquid salt complex from said complexing zone;

atomizing withdrawn salt complex;

intimately mixing the resulting atomizate with molecular oxygen in an otherwise substantially empty salt complex oxidation zone at temperature between about 400° and about 750° for average residence time of about 0.5 to 20 seconds, thereby converting said atomized salt complex into recovered chlorine gas, solid iron oxide and sodium chloride byproduct;

withdrawing said byproduct from said salt complex oxidizing zone; and withdrawing a stream of recovered chlorine gas from said salt complex oxidizing zone.

A further feature of this improvement includes passing said stream of recovered chlorine gas through the same complexing zone used concurrently for contacting said feed vapor with sodium chloride or a similar salt complexing zone in the substantial absence of feed vapor for removal of ferric chloride in said stream as a liquid complex, which complex adds to or can be added to the complex formed from said feed vapor. If said stream is cooled to a temperature slightly above the precipitation point of the ferric chloride therein at operating conditions, it often can help cool the single or dual complexing operation. The net output vapor product of a single complexing operation accepting said stream and said feed vapor can be separated readily into a chlorine-rich gas and a titanium tetrachloride-rich product. The recovered chlorine is useful for chlorinating more ore.

The drawing is a flow diagram depicting the process flows for operating this improvement in various ways; it will be described more fully hereinafter with reference to specific design cases.

In each operating case the following should be understood: complexing zone 13 operates under conditions for converting ferric chloride vapor from a conventional total ore chlorination to yield liquid sodium ferric chloride salt complex while permitting titanium tetrachloride to remain as a vapor residue; salt complex oxidizing zone 20 operates under conditions for generating chlorine gas, and solid iron oxide and sodium chloride byproduct; and the total chlorination of the ore can be done in any conventional fashion (fluidized bed preferred) to generate a feed vapor to zone 13 laden with essentially titanium tetrachloride and ferric chloride, and such total chlorination can employ incidental treatment to remove or transform other impurities; additionally, intermediate treatments of the other process flows indicated can be used where desired or necessary; such treatments are not shown. Typically these could include separations of coke and other solids carry-over from the feed vapor stream from the chlorinator, removal or transformation to $FeCl_3$ of adventitious chlorides such as ferrous chloride from such chlorinator output stream, and cooling or heating of the process streams and the several reaction zones directly or indirectly such as with liquid titanium tetrachloride, liquid chlorine, jackets and other conventional indirect heat transfer apparatus or means, including convection and radiation to atmosphere and spraying of equipment with water.

It should be further understood that in these design cases, the pressure used in each zone will be substantially atmospheric and only high enough in each zone and line to cause the necessary flow of materials indicated, although it should be recognized that subatmospheric and superatmospheric pressures can be used in the several zones where desirable (designed of course to obtain the flow indicated using pumps, blowers, and other conventional apparatus not shown). These zones are housed in conventional equipment composed of or lined with corrosion-resistant metals, alloys or refractory material (silica, fireclay, porcelain, etc) adapted to render the reaction vessels housing such zones substantially inert towards the reactions ensuing and the reaction products thereof under the conditions of operation. The piping, ductwork, and product removal apparatus will be of similar material conventionally constructed.

In a well-operated total chlorination of ore such as ilmenite virtually all the chlorine gas fed to the chlorinator is reacted. A bed of ore and coke, preferably fluidized with chlorine, is maintained at about 900°–1200° and total pressure above the bed preferably is about 1 atmosphere, although this can be broadly between about 0.5 and about 2 atmospheres. Advantageously the solids fed to the bed is about 15–40% coke, balance ore, with about 20% coke preferred. These materials are classified conventionally for fluidizing as in the first design case if a fluidized bed is used. Oxygen gas often is fed in small chlorinators to burn some of the coke for maintaining temperature, although heat can be supplied also in other conventional ways such as external heating, if necessary or desired. In large units heat of reaction usually is adequate to maintain temperature. Superficial vapor velocity above the bed (calculated at temperature and pressure of operation) usually will be between about 0.3 and 2 ft. per second, with about 1 ft. per second being preferred in fluidized bed operation.

A simple and advantageous way of generating the complex of sodium chloride and ferric chloride is shown in U.S. Bureau of Mines R. I. 5428 of 1958. It is to feed the crude vapor stream comprising chlorine gas and unreacted ferric chloride vapor from the ferric chloride oxidation zone into contact with coarse solid sodium chloride crystals or pellets maintained in a static bed disposed to drain. The contacting temperature advantageously is at about 200° to 800° and preferably at about 250° to 350°. The molten or liquid complex forms and drains downwardly and usually counter or cross to gases and vapors ascending the bed at a velocity low enough not to impede the flow of liquid complex significantly or entrain the liquid complex in the vapors leaving such bed. Total pressure when generating the complex preferably is about atmospheric, but can be between about 0.5 and 3 atmospheres.

U.S. Pat. No. 3,683,590 sheds further light on the liquid complex of ferric chloride and sodium chloride and shows how it can be used in the treatment of iron chlorides. Whether the "complex" of sodium chloride and ferric chloride is a eutectic mixture, or richer in one or the other of the ingredients from which it is made, or is an actual compound diluted with one or the other of its forming ingredients or undiluted with same is of no real significance in this improvement so long as it is liquid at a temperature no higher than about 300°. At its lowest melting point such complex approximates the empirical formula $NaFeCl_4$, and it can vary as much as 48 to 65 mol percent $FeCl_3$ and 35 to 52 mol percent NaCl while still being molten or liquid above 250°.

Temperature for such oxidation of the complex with molecular oxygen is between 400° and 750°, and preferably is between 550° and 650°. Total pressure for such reaction generally can be between 0.5 and 7 atmospheres, and preferably is at about 1 atmosphere for efficiency and economy. Average residence time for oxidation of the complex can be between about 0.3 and 20 seconds calculated as indicated in Example 3, below), and preferably is between 3 and 10 seconds for efficiency and economy. While a single reaction zone is preferred for converting such complex into chlorine gas and solid iron oxide and sodium chloride byproducts, such zone can embrace a plurality of interconnected reaction zones for such oxidation. While the complex can be fed to its oxidation zone as a solid, e.g. a powder, it is obviously advantageous to handle it as a liquid at all times, and this is preferred.

Referring again to the drawing, in the first operating case ilmenite ore (particle size through 40 mesh and retained on 200 mesh U.S. Standard Sieve) enters chlorination vessel 9, suitably a fluidized bed chlorinator, in admixture with coke (through 6 and retained on 100 mesh U.S. Standard Sieve) through inlet 6; chlorine gas enters the chlorinator reactor 9 through inlet 8. In small scale operations it is sometimes of advantage to add a little oxygen with the chlorine to provide heat for the chlorination. Large scale chlorinations often are run without any such addition unless the chlorine fed has a little oxygen in it adventitiously. Solid residue from the chlorinator is withdrawn through outlet 7. Feed vapor laden with titanium tetrachloride and ferric chloride (and containing other typical volatile ilmenite-chlorination impurities such as $MnCl_2$ and $MgCl_2$, but cleansed conventionally of solids and readily removed impurities) passes through line 11 into complexing zone 13 housed in reactor 12.

Complexing zone 13 is a fixed bed of extremely coarse solid sodium chloride crystals and/or pellets e.g., rock salt, supported by a foraminous support that permits vapor upflow and downward drainage of the resulting liquid sodium chloride salt complex into the bottom of reactor 12. Makeup sodium chloride pellets or crystals are fed into reactor 12 through inlet 16 as is necessary. In complexing zone 13 the ferric chloride and sodium chloride combine at a temperature of about 3002° to provide a liquid molten salt complex approximately the proportions of $NaFeCl_4$, which may contain in addition, a dissolved excess of either sodium chloride or ferric chloride; this complex will have a minimum melting point of about 159°, but this can be higher by many degrees due to such excess and still remain liquid under the conditions of operation.

The vapor residue comprising titanium tetrachloride and other uncomplexed materials is withdrawn from the top of reactor 12 by outlet 14. This product is rich in titanium tetrachloride, and it also contains $CO_2$, CO, unreacted metal chloride vapors, and free chlorine drawn off the chlorinator.

Molten salt complex drains through reactor 12 through outlet 15. It is passed through line 17, then sprayed as a fine spray by means not shown into salt complex oxidizing zone 20 housed in reactor 19. A stream of tonnage (95+% pure) oxygen enters zone 20 through line 18 for intimate mixing with said spray of complex. The oxygen fed can be at least stoichoimetric for converting all of the said chloride equivalent in the salt complex into ferric oxide, and often is slightly in excess of or below the stoichiometric. When practicing the preferred embodiment of this improvement (by contacting the off gas with rock salt), a slightly less than stoichiometric feed of molecular oxygen (about 2-10 mol percent less) is used to get the purest net gas output very efficiently.

Reactor 19 is lined with high alumina firebrick to form an otherwise substantially empty oxidation zone 20 large enough to give an average residence time of about 4 to 8 seconds (calculated as indicated in Example 3, below), and large enough in diameter to permit sufficient settling of the solid byproduct to the bottom thereof. Advantageously the bottom is sloped, such as in an inverted frustoconical section, for accumulation and ready removal of the byproduct through a rotary valve or the like (not shown). If desired, instead of zone 20 being mainly cylindrical, the top of zone 20 can be enlarged for slowing down flows and permitting more efficient settling of the solids in the reaction, using gradual upward enlargement or a frustoconical transformation piece from an enlarged top section to the smaller section below to give this reactor a topheavy effect.

In zone 20 salt complex is oxidized at 600° to yield solid iron oxide and sodium chloride byproduct, and this is withdrawn continuously through outlet 21 while the chlorine product is withdrawn through outlet 22 and line 23. One or both of the reactants entering lines 17 and 18 can be arranged to give a swirl or helical effect to ascending vapors in the zone, and this usually is advantageous for the reaction and for the separation of solids.

In the second design case, the molecular oxygen feed into inlet 18 is 10% above the stoichiometric proportion for forming $Fe_2O_3$ with the salt complex being fed into zone 20 through line 17. Instead of withdrawing chlorine product from line 23, this product is shunted through line 24 and into indirect cooler 26, said cooler being cooled with a spray of water on its outside. The hot vapors passing through the cooler are cooled to a temperature of about 250°-300° (this temperature being high enough to prevent precipitation of any ferric chloride). Actually, because the operation is essentially at atmospheric pressure and the mol fraction of unreacted ferric chloride in the stream is very small, e.g., often about 10 mol percent, this vapor stream can be cooled to substantially lower temperature and down to just above the precipitation point of ferric chloride in the cooled stream.

The cooled vapors then are injected into zone 13 for generating additional complex and ridding the stream from line 27 of ferric chloride. The vapor takeoff from zone 13 through line 14 then contains all of the components that were present therein in the first design case plus a volume of chlorine usually containing some free oxygen. The chlorine and oxygen can be separated conventially from the other components, for example by condensation of such other components (which then can be distilled for purification in conventional manner). Chlorine gas-rich material thus separated is useful for subsequent chlorination of titaniferous ore. Other than this, the operation is essentially like that of case I.

The solid byproduct can be leached with water to separate sodium chloride from the iron oxide, and salt recovered from the pregnant leach solution by conventional processing such as multiple effect evaporation. Sometimes it is advantageous to grind the byproduct and magnetically separate and/or elutriate some of the more dense iron oxide from the less dense salt preparatory to leaching such oxide.

Atomizing a liquid complex is preferred, but it is, of course, permissible to solidify the droplets for feed to the oxidizer, or to grind larger solidified masses of such complex to make such feed.

In any of the foregoing operations on a reasonably large scale (reactor diameters of 6 feet or larger) it is unlikely that any of the reaction zones, particularly when adequately insulated, will need much if any additional heat supply to sustain the reaction at the desired temperature or within a narrow desired temperature range once their reactions are on stream. On such scale the salt complexing step desirably is indirectly cooled, and also cooled by the inlet of vapors from line 27. However, the substantially smaller reactors, or substantial heat leak, or in startups, or when supplying solid particulate complex feed to zone 20, it is sometimes necessary or desirable to supply heat to one or more of the reactors and lines (even though at a later stage of the operation of the same equipment some cooling can be necessary to maintain desired temperature) because of the generally exothermic nature of the reactions including the complexing. Hence it is certainly feasible to add to reaction zone 20 a fuel such as carbon monoxide, carbon, phosgene, or the like burns during the process in such zone with oxygen being fed thereto. Alternatively, reactors 12 and 19 can be indirectly heated and the feeds thereto and withdrawals therefrom heated and cooled in conventional manner. Reactor 12 also can be indirectly cooled and heated in conventional manner in internal elements in the bed and/or exterior jacket or water spray. Gases such as hot products of combustion of CO can be admitted directly into the complexing zone, but this is less desirable because of the product dilution which then occurs. When the wall of reactor 19 is heated from the exterior, little if any solids build-up on it is likely to occur. The processing advantageously is kept substantially anhydrous in all steps illustrated for obvious reasons. The cooling of gaseous output from line 22, and even the very top of reactor 19 internally, can be done advantageously by injecting a small stream of liquid chlorine or liquid titanium tetrachloride into that stream or at the top of the reactor (by means not shown). This also arrests oxidation of the $FeCl_3$, but one should keep it above the point where it does not liquify or solidify, but it can convert at least in part to the dimer ($Fe_2Cl_6$) form. (Where ferric chloride is referred to herein as $FeCl_3$, it should be interpreted as an empirical rather as than a molecular formula).

The following examples show ways in which this improvement can be operated, but should not be construed as limiting the invention. All percentages herein are wt. percentages, all parts are parts by weight, and all temperatures are in degrees centigrade unless otherwise expressly noted.

EXAMPLE 1

A laboratory total chlorination of weathered New Jersey ilmenite sands (61.8% $TiO_2$, 22.5% total Fe, −40 to +200 mesh size) was maintained in an essentially atmospheric pressure vertical cylindrical quartz fluid bed chlorinator 74mm O.D. by 38 inches tall. The chlorinator was externally heated by electrical heating to maintain temperature of 1000° in the bed. Chlorine gas at the rate of 1053 grams per hour was admitted through a porous quartz disc 7½ inches above the bottom. Gas and vapor (containing a trace of carbon solids) were withdrawn from a duct 8½ inches below the top, said duct being externally heated by electricity. The initial bed was 1000 grams of ore residue from a previous ilmenite chlorination mixed with 200 grams of petroleum coke particles that would be retained on a 40 mesh U.S. Std. Seive.

Fresh ilmenite ore and fresh +40 mesh petroleum coke were fed as a mixture through a quartz tube entering the top of the chlorinator and discharging therein at a point 5 cm. above the porous disc. This inlet tube was purged with 1.4 SCFH (measured at 70°F. and 1 atmosphere total pressure) of nitrogen gas to preclude entry of chlorination product gases. Fresh ore feed was 623 grams per hour and fresh coke feed was 116 grams per hour. About 1310 grams per hour of ferric chloride and titanium tetrachloride vapor was removed from said duct along with nitrogen, carbon oxides and other chlorination products such as 32 grams per hour of $FeCl_2$ and 9 grams per hour of $MnCl_2$. Carbon oxides were analyzed by gas chromatograph and ran 25 mol percent CO and 75 mol percent $CO_2$. From 95 to 100% of the chlorine gas introduced to the chlorinator was reacted.

EXAMPLE 2

Hot gases leaving the chlorinator of Example 1 can be passed through a dust separator such as a hot cyclone separator and into an inlet near the base of a vertical salt complexing reactor like that illustrated on page 3 of the U.S. Bureau of Mines Report of Investigations 5428 (1958) — Library of Congress catalogue number (TN23. U43 No. 5428 *669.732 58-62264). Herein the $FeCl_3$ at about atmospheric pressure complexes with rock salt; vapors drawn off the top are the uncomplexed gases and vapors comprising titanium tetrachloride, while virtually all of the $FeCl_3$ fed is drawn off the base as molten $NaCl$-$FeCl_3$ "complex". The complexing reaction zone is maintained at 250°–300° by indirect heat exchange applied to the reactor walls.

EXAMPLE 3

Molten $NaCl$-$FeCl_3$ complex drawn off the base of the complexing reactor of Example 2 can be passed through an electrically heated line and into an atomizing nozzle that discharges into a complex oxidizer made of quartz, an unpacked and essentially empty cylindrical vessel (except for probes) with a frustroconical bottom outlet for byproduct solids, with oxygen (99.6% pure) being fed into the side wall of the conical section and the salt complex being fed as a spray slightly above such section. The entry points of the atomizate and oxygen are substantially horizontal and tangential to the inside walls of this oxidation zone to impart inward helical flow to the vapors, gases, and particles isn said zone as the vapors and gases ascend. Atomization can be assisted by use of a small flow of nitrogen in the nozzle. The liquid complex atomizate mixes intimately with the oxygen. This salt complex oxidizing zone is maintained at about 1 atmosphere total pressure and 500°, utilizing in part the exothermic heat of reaction and liquid feed electrical preheating, with additional provision for indirect heat exchange around the oxidizer walls. At this temperature the vapor pressure of $NaFeCl_4$ over liquid $NaFeCl_4$ is only about 1mm. Hg and the vapor pressure of $Fe_2Cl_6$ over liquid $NaFeCl_4$ is only about 10 mm Hg. The reaction with oxygen is thought to be mainly with the liquid $NaCl$-$FeCl_3$ complex and can be represented as follows:

$$4NaFeCl_4(l)+3O_2(g)=2Fe_2O_3(s)+4NaCl(s)+6Cl_2(g).$$

and the oxygen feed to this reactor is essentially stoichiometric for this reaction.

At the bottom of this salt complex oxidation reactor particles of mainly $Fe_2O_3$ and $NaCl$ are discharged through a rotary valve. The product gas, consisting mainly of $Cl_2$ with a small amount of unreacted ferric chloride and oxygen, is cooled directly to about 250°–275° with an inlet spray of liquid chlorine, then passed through a dust collector to remove iron oxide fines. This suppresses further oxidation of $FeCl_3$ in this stream. Average residence time in this oxidation zone will be about 7–10 seconds and the conversion of $FeCl_3$ to $Fe_2O_3$ and $Cl_2$ about 92%. Average residence time in this oxidation zone will be about 6–10 seconds and the conversion of $FeCl_3$ to $Fe_2O_3$ and $Cl_2$ about 92%. Said residence time is computed on the basis that the oxygen fed is 100% pure, with 92 mol% of each mol of oxygen being converted immediately into 2 mols of chlorine gas while 8 mol% of it remains as molecular oxygen gas these gases at 500° and 1 atmosphere total pressure, all volumes of ferric chloride vapor including unreacted ferric chloride vapor remaining, and the feed and the byproduct solids are ignored, and plug (i.e. piston) flow of the chlorine and unreacted oxygen takes place through the otherwise empty reaction zone.

The cooled product gas then can be recycled to the salt complexing reactor of Example 2, along with the feed vapor from the ilmenite chlorinator, to remove unreacted ferric chloride from such cooled product gas. Vapors from the salt complexing reactor thus will contain the extra chlorine supplied from said cooled product gas.

I claim:

1. In a process for chlorination of titaniferous material with chlorine gas with the resulting generation of a feed vapor laden with titanium tetrachloride and ferric chloride, the improvement which comprises:

contacting said feed vapor with sodium chloride in a complexing zone under conditions for converting said ferric chloride therein into liquid ferric chloride salt complex while permitting said titanium tetrachloride to remain as vapor residue;

withdrawing said liquid salt complex from said complexing zone;

atomizing withdrawn salt complex;

intimately mixing the resulting atomizate with molecular oxygen in a substantially empty salt complex oxidation zone at temperature between about 400° and about 750° C. for average residence time of about 0.5 to 20 seconds, thereby converting said atomized salt complex into recovered chlorine gas, solid iron oxide and sodium chloride byproduct;

withdrawing said byproduct from said salt complex oxidizing zone;.

withdrawing a stream of recovered chlorine gas from said salt complex oxidizing zone; and contacting said withdrawn stream of recovered chlorine gas with sodium chloride in a complexing zone under conditions for converting the ferric chloride therein into liquid ferric chloride salt complex while permitting chlorine gas to remain as a gas residue, and removing said gas residue from said complexing zone.

2. The product of claim 1 wherein said complexing zone for said withdrawn stream is the same one used concurrently for contacting said feed vapor with sodium chloride, and said stream is cooled to a temperature slightly above the precipitation temperature of the ferric chloride therein prior to said contacting.

3. The process of claim 1 wherein said withdrawn stream is contacted with said sodium chloride in the substantial absence of feed vapor, and said stream is cooled to a temperature slightly above the precipitation temperature of the ferric chloride therein prior to said contacting.

* * * * *